(12) United States Patent
Lu

(10) Patent No.: US 7,321,610 B2
(45) Date of Patent: Jan. 22, 2008

(54) METHOD AND SYSTEM OF INTERFERENCE CANCELLATION IN MULTI-CELL CDMA SYSTEMS

(75) Inventor: Chun Chian Lu, Hsinwu Hsiang (TW)

(73) Assignee: Industrial Technology Research Institute, Hsinchu (TW)

(\*) Notice: Subject to any disclaimer, the term of this patent is extended or adjusted under 35 U.S.C. 154(b) by 979 days.

(21) Appl. No.: 10/218,456

(22) Filed: Aug. 15, 2002

(65) Prior Publication Data
US 2003/0179698 A1 Sep. 25, 2003

Related U.S. Application Data

(60) Provisional application No. 60/365,181, filed on Mar. 19, 2002.

(51) Int. Cl.
  H04B 1/707 (2006.01)
  H04L 27/28 (2006.01)
  H04J 11/00 (2006.01)
(52) U.S. Cl. .................. 375/148; 375/260; 370/209; 370/335
(58) Field of Classification Search ........ 375/142–144, 375/147, 148, 150, 152, 260, 343; 370/209, 370/320, 335, 342
  See application file for complete search history.

(56) References Cited

U.S. PATENT DOCUMENTS

| | | | |
|---|---|---|---|
| 5,467,368 A | 11/1995 | Takeuchi et al. ............. | 375/206 |
| 5,790,606 A | 8/1998 | Dent ........................... | 375/348 |
| 5,917,829 A | 6/1999 | Hertz et al. ................. | 370/479 |
| 6,148,041 A | 11/2000 | Dent ........................... | 375/340 |
| 6,868,111 B1 * | 3/2005 | Oleynik ....................... | 375/145 |

(Continued)

OTHER PUBLICATIONS

S. Verdu, "Minimum probability for error for asynchronous Gaussian multiple-access channels", IEEE Trans. Information Theory. vol. IT-32, No. 1, pp. 85-96, Jan. 1986.

(Continued)

Primary Examiner—Young T. Tse
(74) Attorney, Agent, or Firm—Akin Gump Strauss Hauer & Feld LLP

(57) ABSTRACT

In signal detection system and method implemented to reduce the effects of interference in multi-user detection systems, a receiver defines a frame of symbols containing at least one window based upon a number of user signals contained in a received signal r(t). A symbol amplitude of a single-user in the multi-user system is approximated over the window of the frame based on a number of reflected signal paths of the received user signal. A perturbative correction value is calculated based upon a correlation matrix. An estimation of the symbol amplitude of the single-user signal is calculated over one or a number of windows of the frame. The single-user signal is detected when the symbol amplitudes of the entire signal within the frame has been calculated. To reduce the number of interfering users in a multicell CDMA system, the symbol codes are modified to include an even code and an odd code. The even and odd codes are symmetrically separated over the duration of the symbol to form an interference reduction window. If the delay offsets of the symbol codes are less than the interference reduction window and the even codes are assigned to a first cell, and odd codes to adjacent cells, then the adjacent cell interference vanishes.

27 Claims, 11 Drawing Sheets

U.S. PATENT DOCUMENTS 6,873,646 B2 *   3/2005   Lu .............................. 375/144
7,103,095 B2 *   9/2006   Papasakellariou ........... 375/150

OTHER PUBLICATIONS

S. Moshavi. "Multi-user detection for DS-CDMA communications," IEEE Communications Magazine, pp. 124-136, Oct. 1996.

D. Divsalar, M. K. Simon and D. Raphaeli, "Improved parallel interference cancellation for CDMA," IEEE trans. Commun., vol. 46, No. 2, pp. 258-268, Feb. 1998.

C. C. Lu, "Perturbation methods for canceling multi-user interference," The Sixth IEEE Symposium on Computers and Communications, Hammamet, Tunisia, pp. 204-209, Jul. 2001.

C. C. Lu, "Perturbation methods for canceling interference in CDMA systems," The Eighth IEEE International Conference on Electronics, Circuits and Systems, Malta, pp. 1143-1146, Sep. 2001.

C. C. Lu, "Perturbation principle of multi-user detection," The 3rd IEEE International Conference on Mobile and Wireless Communications Networks, Recife, Brazil, Aug. 2001.

H. H. Chen, J. F. Yeh and N. Suehiro, "A multicarrier CDMA architecture based on orthogonal complementary codes for new generations of wideband wireless communications", IEEE Communications Magazine, pp. 126-135, Oct. 2001.

A. Hills, "Large-scale wireless LAN design", IEEE Communications Magazine, pp. 98-104, Nov. 2001.

C. C. Lu, "Synchronize base stations and handsets in CDMA and TDMA Systems,"The 14th International Conference on Information Networking, pp. 3c-2.1-3c-2.7, Jan. 2000.

E. Kudoh and T. Matsumoto, "Effect of transmitter power control imperfections on capacity in DS/CDMA cellular mobile radios," IEEE SUPERCOMM/ICC '92, Discovering a New World of Communications, New York., NY, vol. 1, pp. 237-242, Jun. 1992.

Marco A. Hernandez, Gerard J. M. Janssen and Ramjee Prasad, "Uplink Performance Enhancement for WCDMA Systems through Adaptive Antenna and Multiuser Detection," VTC 2000, pp. 571-575.

* cited by examiner

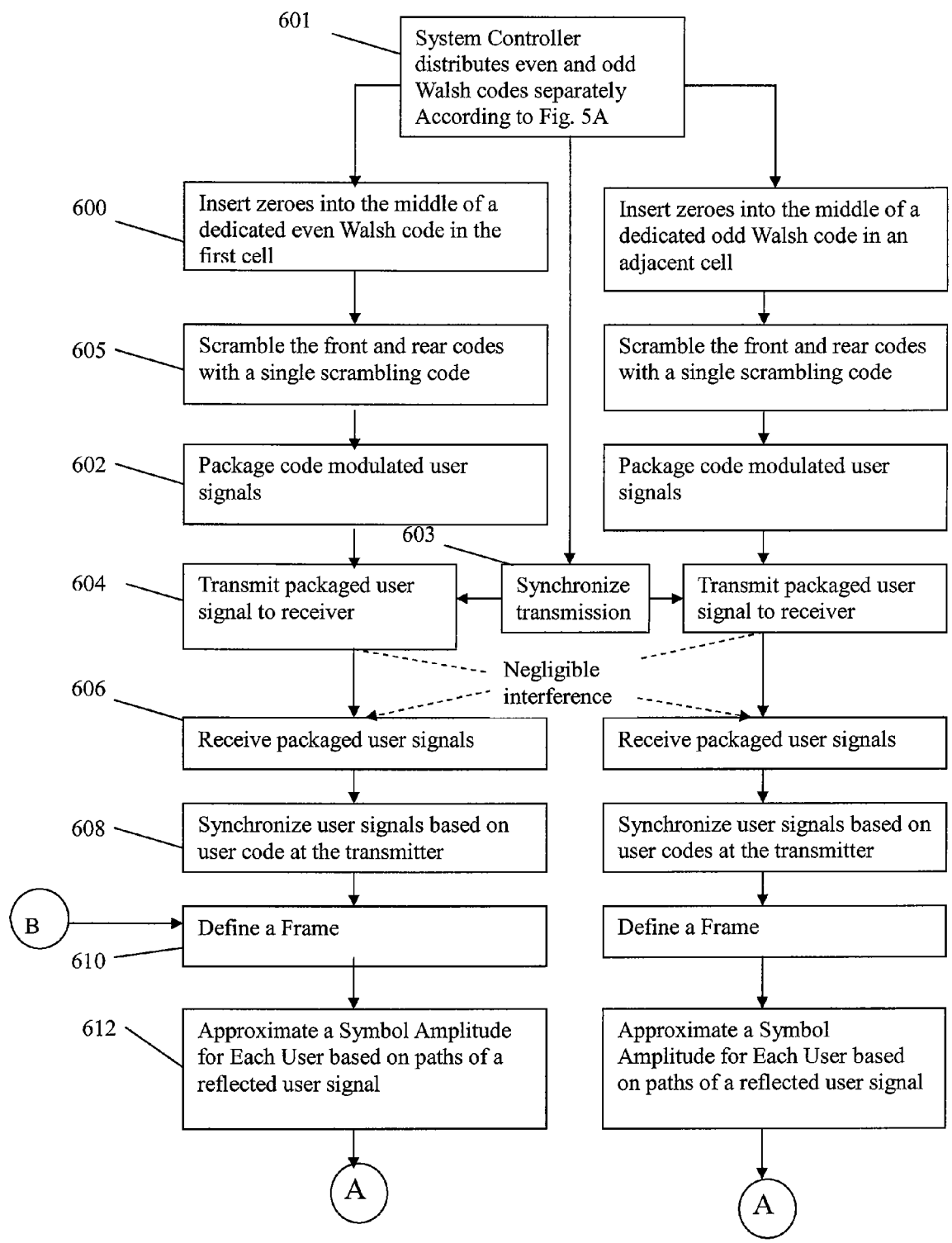

METHOD AND SYSTEM OF INTERFERENCE CANCELLATION IN MULTI-CELL CDMA SYSTEMS

DESCRIPTION OF THE INVENTION

This application claims the benefit under 35 U.S.C. § 119(e) of U.S. provisional application No. 60/365,181 entitled "Methods of Interference cancellation in Multi-cell CDMA Systems," filed on Mar. 19, 2002, the disclosure of which is expressly incorporated herein by reference.

FIELD OF THE INVENTION

The present invention relates to a multi-user detection scheme in a direct sequence code-division multiple-access (DS-CDMA) communication system and, more particularly, to a method and system for reducing the effects of multi-user interference, in multi-cell systems.

BACKGROUND OF THE INVENTION

Multiple access communication system schemes such as frequency division multiple access (FDMA), time-division multiple access (TDMA), and code-division multiple access (CDMA) are designed to eliminate or reduce signal interference between multiple users. In real-world applications, however, signals received over a wireless medium in a multiple access communication system suffer from signal degradation caused by a number of factors including multiple access interference (MAI), intersymbol interference (ISI), and adjacent cell interference (ACI). MAI and ISI are by-products of multipath fading, a phenomenon in which an originally transmitted signal and multiple reflections of the originally transmitted signal arrive at a receiver at different times. Multipath fading degrades system performance because each reflected signal experiences attenuation, a time delay, and a possible frequency shift before being received at the receiver. ACI is a by-product of a multi-cell environment wherein a signal in a subject cell is distorted by noise introduced from a signal in a neighboring cell. Each cell in a multi-cell environment defines an area in which an associated base station manages signal communications. Typically, the managing area extends in a radial direction from the location of the base station. The area covered by a cell is dependent upon a number of factors including, for example, signal degradation due to adjacent cell interference and multipath interference caused by environmental structures.

Numerous designs have been proposed to reduce multi-user interference and the adverse manner in which it effects signal reception. High expense and component complexity associated with implementing such designs, however, limit their effectiveness. Conventional CDMA systems using a rake receiver, for example, require channel estimation processing, code acquisition and tracking, fast power control, and frequent hand-over for every path of a received signal. The above-mentioned systems generally require numerous redundant overhead parameters such as synchronization and pilot channels to reduce the complexity of signal processing. When these systems are implemented, however, the foregoing parameters have little to no effect in reducing or eliminating interference.

Another conventional CDMA system uses large area synchronous code-division multiple access (LAS-CDMA) technology for reducing interference. LAS-CDMA implements smart coding and an interference reduction window to reduce the impact that multiple access interference, inter-signal interference, and adjacent cell interference have on signal communication. In generating smart codes, an LAS-CDMA receiver establishes an interference reduction window by transmitting codes with an offset auto-correlation and cross correlation coefficient equal to zero. The interference reduction window can provide a solution for reducing multi-path interference, however, LAS-CDMA fails to reduce or eliminate intersymbol interference. Moreover, LAS-CDMA technology reduces intercell interference but at the expense of a significant reduction in the space allotted for user codes. A further shortcoming of LAS-CDMA technology involves a reduction in channel and system capacity.

In light of the aforementioned problems encountered by existing multi-cell multiple access communication systems there is a need for a multi-cell CDMA system that can significantly reduce the effects of interference and at the same time simplify the CDMA system design.

SUMMARY OF THE INVENTION

Methods and systems consistent with the present invention reduce the effects of interference when detecting the signal of a user in a multi-user detection system.

In accordance with the purpose of the invention, as embodied and broadly described, one aspect of the invention provides a method of detecting a single user in a multi-user communication system. The method comprises steps of receiving a plurality of user signals; defining a frame having a window that includes a sequence of at least three symbols for each received user signal; calculating an amplitude approximation of a selected one of the plurality of received user signals based on a zero-order approximation of the sequence; correlating the sequence of the selected user signal with the sequence of at least one other user signal within the window of the frame based at least on a plurality of reflection paths corresponding to the sequence of each received user signal; calculating an amplitude correction value based on the correlated sequences of the frame for adjusting the amplitude approximation; and shifting the window of the frame, when the selected user signal has not been processed in its entirety, so that the amplitude approximation can be adjusted for each additional sequence.

Another aspect of the present invention provides a method of detecting a single user across multiple cells of a communication system. The method comprises steps of receiving a plurality of user signals; defining a frame having a window that includes a sequence of at least three symmetrically partitioned symbols for each received user signal; calculating an amplitude approximation of a selected one of the plurality of user signals based on a zero-order approximation of the sequence of the selected user signal; correlating the sequence of the selected user signal with the sequence of at least one other user signal within the window of the frame based at least on a plurality of reflection paths associated with each received user signal; calculating an amplitude correction value based on the correlated sequences of the frame for adjusting the amplitude approximation; and shifting the window of the frame, when the selected user signal has not been processed in its entirety, so that the amplitude approximation can be adjusted for each additional symmetrically partitioned sequence.

Still another aspect of the invention provides an apparatus for detecting a single user in a multi-user communication system. The apparatus comprising means for receiving a plurality of user signals; means for defining a frame having a window that includes a sequence of at least three symbols for each received user signal; means for calculating an amplitude approximation of a selected one of the plurality of user signals based on a zero-order approximation of the sequence of the selected user signal; means for correlating the sequence of the selected user signal with the sequence of at least one other user signal within the window of the frame based at least on a plurality of reflection paths associated with each received user signal; means for calculating an amplitude correction value based on the correlated sequences of the frame for adjusting the amplitude approximation; and means for shifting the window of the frame, when the selected user signal has not been processed in its entirety, so that the amplitude approximation value can be adjusted for each additional sequence.

An additional aspect of the present invention provides an apparatus for detecting a single user across multiple cells of a communication system. The system comprises means for receiving a plurality of user signals; means for defining a frame having a window that includes a sequence of at least three symmetrically partitioned symbols for every received user signal; means for obtaining an amplitude approximation of a selected one of the plurality of user signals based on a zero-order approximation of one of the sequence of the selected user signal; means for correlating the sequence of the selected user signal with the sequence of at least one other user signal within the window of the frame based at least on a plurality of reflection paths associated with each received user signal; means for calculating from the correlation an amplitude correction value based on the correlated sequences of the frame for adjusting the amplitude approximation; and means for shifting the window of the frame, when the selected signal has not been processed in its entirety, so that the amplitude approximation can be adjusted for each additional symmetrically partitioned sequence.

Another aspect of the present invention provides a method for single user perturbation projection in a multiuser communication system. At a transmitter the method comprises steps of modifying existing Walsh codes such that front and rear codes are separated by a finite gap, scrambling the front and rear codes with a single scrambling code, packaging a plurality of user signals code modulated with at least the modified Walsh codes, and transmitting the packaged user signals over a wireless medium.

Another aspect of the present invention provides a method for single user perturbation projection in a multicell communication system. At a transmitter, the method comprises generating even Walsh codes in a first cell and odd Walsh codes in adjacent cells; modifying the even and odd codes to provide front and rear codes separated by a finite gap; scrambling the front and rear codes with a single scrambling code; packaging a plurality of user signals, code modulated with at least the modified Walsh codes; and transmitting the packaged user signals over a wireless medium.

Still another aspect of the present invention provides a system comprising means for modifying existing Walsh codes to generate front and rear codes; means for scrambling the front and rear codes with a single scrambling code; means for packaging a plurality of user signals, wherein the user signals are code modulated with at least the modified Walsh code; means for transmitting the packaged user signals; means for dedicating an even code of the packaged user signals to a first cell and an odd code of the packaged user signals to adjacent cells; means for receiving the packaged user signals; means for synchronizing the packaged user signals to a corresponding user code; means for defining a frame having a window that includes a sequence of at least three symmetrically partitioned symbols for each synchronized user signal, wherein the length of the window is determined by the modified Walsh code; means for calculating an amplitude approximation of a selected one of the plurality of user signals based on a zero-order approximation of the sequence of the selected user signal; means for correlating the sequence of the selected user signal with the sequence of at least one other user signal within the window of the frame based at least on a plurality of reflection paths associated with each received user signal; means for calculating an amplitude correction value based on the correlated sequences of the frame for adjusting the amplitude approximation; and shifting the window of the frame, when the selected user signal has not been processed in its entirety, so that the amplitude approximation can be adjusted for each additional symmetrically partitioned sequence.

Additional aspects of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and, together with the description, serve to explain the principles of the invention.

BRIEF DESCRIPTION OF THE DRAWINGS

In the drawings:

FIGS. 6A-6B are a flow diagram illustrating single user projection detection for multipath propagation with adjacent cell interference cancellation consistent with methods and systems of the present invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1A:
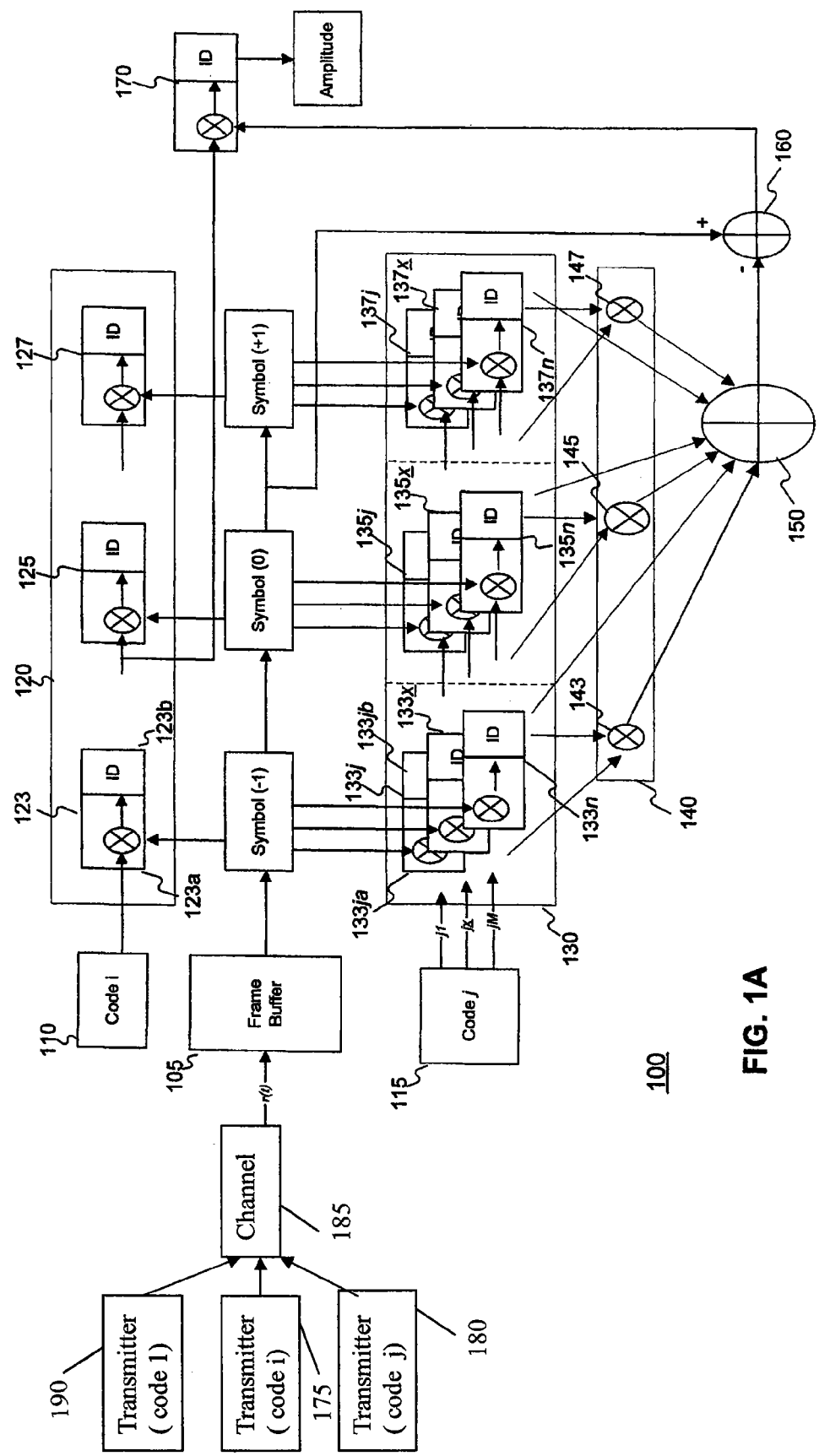
FIG. 1A is a block diagram illustrating a general configuration of a CDMA detector consistent with methods and systems of the present invention.

FIG. 1A illustrates the general features of a perturbation CDMA receiver 100. At a transmitter, a signal of a user is modulated using a shift-keying technique, multiplied by a distinct user code, identified by code 1, code i, code j in block 190, 175 and 180, respectively, and subsequently transmitted over a channel 185. A received signal r(t) includes a signal associated with each user transmitting information across multiple channels. Perturbation CDMA receiver 100 receives signal r(t) as a linear combination of a series of binary pulses called symbols. To detect one or more users, perturbation CDMA receiver 100 includes a frame buffer 105, user code i generator 110, a user code j generator 115, correlator banks 120 and 130, correlator 170, multiplier bank 140, and summers 150 and 160.

Frame buffer 105 buffers the received signal r(t) and separates the signal into contiguous windows, where each user signal within a particular window contains three symbols with indices −1, 0, and 1.

Code i generator 110 is an oscillator that locally generates a distinct use code to detect the information of a single use i from transmitter 175 in received signal r(t). Due to code delay derived from the delay lock tracking of received signal r(t), the user code generated by code i generator 110 begins at a time $\tau_{il}$ for an $1^{th}$ path in a multipath environment.

Code j generator 115 is an oscillator that locally generates the distinct user codes corresponding to users other than user i (e.g. from transmitter 180) having information contained in received signal r(t). User signals having distinct codes and delays are identified as interference signals.

Correlator banks 120 and 130, and correlator 170 all function to match the information of two signals and thereafter filter the resulting signal so that portions of the matched result can be suppressed. Correlator banks 120 and 130 further contain correlators 123, 125, and 127 and correlators $133_j$ through $133_n$, $135_j$ through $135_n$, and $137j$ through $137n$, respectively. Furthermore, correlator 170, as well as each individual correlator contained within correlator banks 120 and 130.

Multiplier bank 140 contains multipliers 143, 145, and 147 for matching the information of two separate signals. These matched signals will be described in detail below.

Summers 150 and 160 add the results of at least two signals to calculate the effects of interference.

In FIG. 1A, correlators 123, 125, and 127 each perform a multiplication and integration operation on a signal received from code i generator 110 and a corresponding coherent sample of symbols S(−1), S(0), and S(+1), respectively. In correlator 123, for example, a multiplier 123a matches a sample generated by user code i generator 110 and a corresponding coherent sample of symbol S(−1) through a multiply operation. Next, an integrator 123b integrates the product represented by the matched result over the period of symbol S(−1) and dumps the resulting value. The dumped integration result represents single-user detection values or zero-order amplitudes of the user signal and is used when calculating the amplitude of users other than user i having information contained in received signal r(t). It should be apparent that concerning user symbols S(0) and S(+1), each of correlators 125 and 127 performs identical operations as performed by correlator 123.

Correlator bank 130 contains correlators $133j$ through $133n$, $135j$ through $135n$, and $137j$ through $137n$. Each set of correlators performs a multiply and integration operation on a sample of user code j1 through jM and a corresponding coherent sample of symbols S(−1), S(0), and S(+1), thereby producing a zero-order amplitude for user codes j1 through jM at the given code delay. In correlator $133j$, for example, multiplier $133ja$ matches a sample of user code j1 to a sample of symbol S(−1). Next, integrator $133jb$ integrates the product represented by the matched result over the period of symbol S(−1) and provides the integration result to multiplier bank 140.

Once symbols S(−1), S(0), and S(+1) are correlated to each of user codes j1 through jM, multiplier bank 140 multiplies the zero order amplitudes output by each correlator by the corresponding user code j1 through jM. Multiplier 143, for example, multiplies the output of each correlator $133j$ through $133n$ by the associated user code j1 through jM, respectively, and provides the product on its output to summer 150. Summer 150 adds the results of multiplier bank 140 further producing a resultant interference signal having a time sequence in parallel with the received signal r(t). Summer 160 receives the resultant interference signal output of summer 150, and subtracts the resultant interference signal from the portion of received signal r(t) contained in the window under analysis. Correlator 170 receives the resultant signal of summer 160 and matches the middle symbol generated by user code i generator 110, thus filtering any unwanted portions of the signal to produce a first order corrected amplitude $a_{nil}$.

Figure 1B:
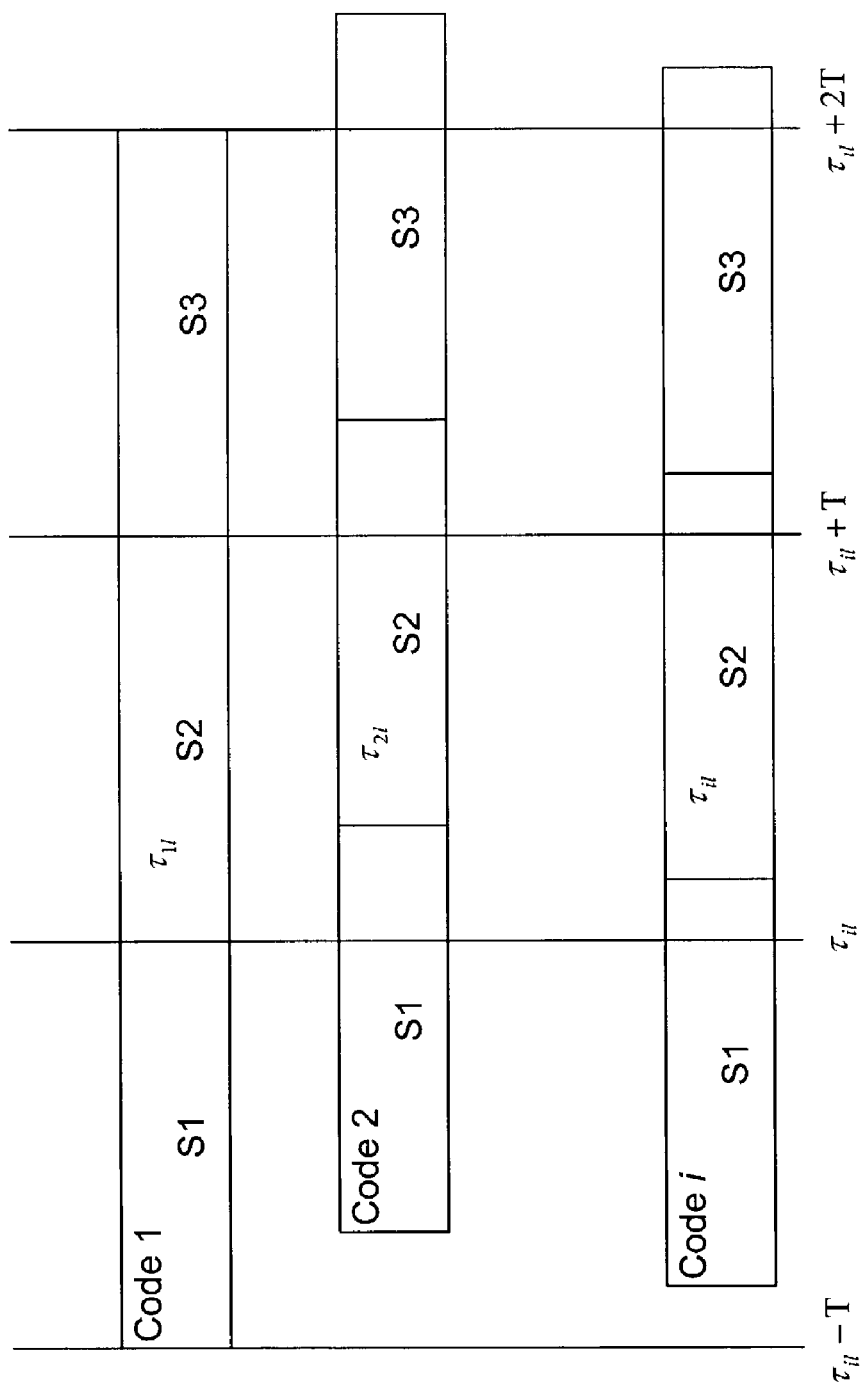
FIG. 1B illustrates a defined 3-symbol window of user signals consistent with methods and systems of the present invention.

FIG. 1B illustrates an example of a 3-symbol window corresponding to S(−1), S(0), S(+1) in FIG. 1A, and used in implementing embodiments consistent with the present invention. In practical CDMA applications, the channel is a synchronous, which means the non-coherent signals are randomly delayed and offset from one another. Because each user code has a different delay, the symbol boundary of a particular user code relative to the symbols of all the user codes in a window are non-uniform, i.e., a synchronous. Therefore, in embodiments consistent with the present invention, at time t within any 3-symbol window, the received non-coherent spread spectrum baseband signal corresponding to multiple users in a multipath environment can be written as follows:

$$r(t) = \sum_n \sum_{i=1}^M \sum_{l=1}^p a_{nij} \psi_i(t - \tau_{il} - nT) \quad (1)$$

where

M=number of users,

T=symbol period, $\psi_i$=spreading code of user i, $\tau_{il}$=time delay of $\psi_i$ at t=0 and along path l; $\tau$<T.

p=number of paths, $a_{nil}$=amplitude of symbol n of user i path l, and n=symbol number.

$\psi_i$ is defined for t between $\tau_{il}$+nT and $\tau_{il}$±(n+1)T, and $\psi_i$ is zero for t outside the current window of the frame. As shown in FIG. 1B, any three users for a signal propagating along three paths represented by three codes: Code 1, Code 2, and Code i. Each user's code is segmented into three symbols (S1, S2, S3), and each user has one symbol starting in each of three time intervals [−T, 0], [0, T], and [T, 2T]. For example, user i has the first symbol S1 starting at time $\tau_{il}$−T and ending at time $\tau_{il}$, the second symbol S2 starts at time $\tau_{il}$ and ends at time $\tau_{il}$+T, and the third symbol S3 starts at time $\tau_{il}$+T and ends at time $\tau_{il}$+2T. Any symbol that does not fall in current intervals will have no effect on the symbols in the current intervals.

Figure 2:
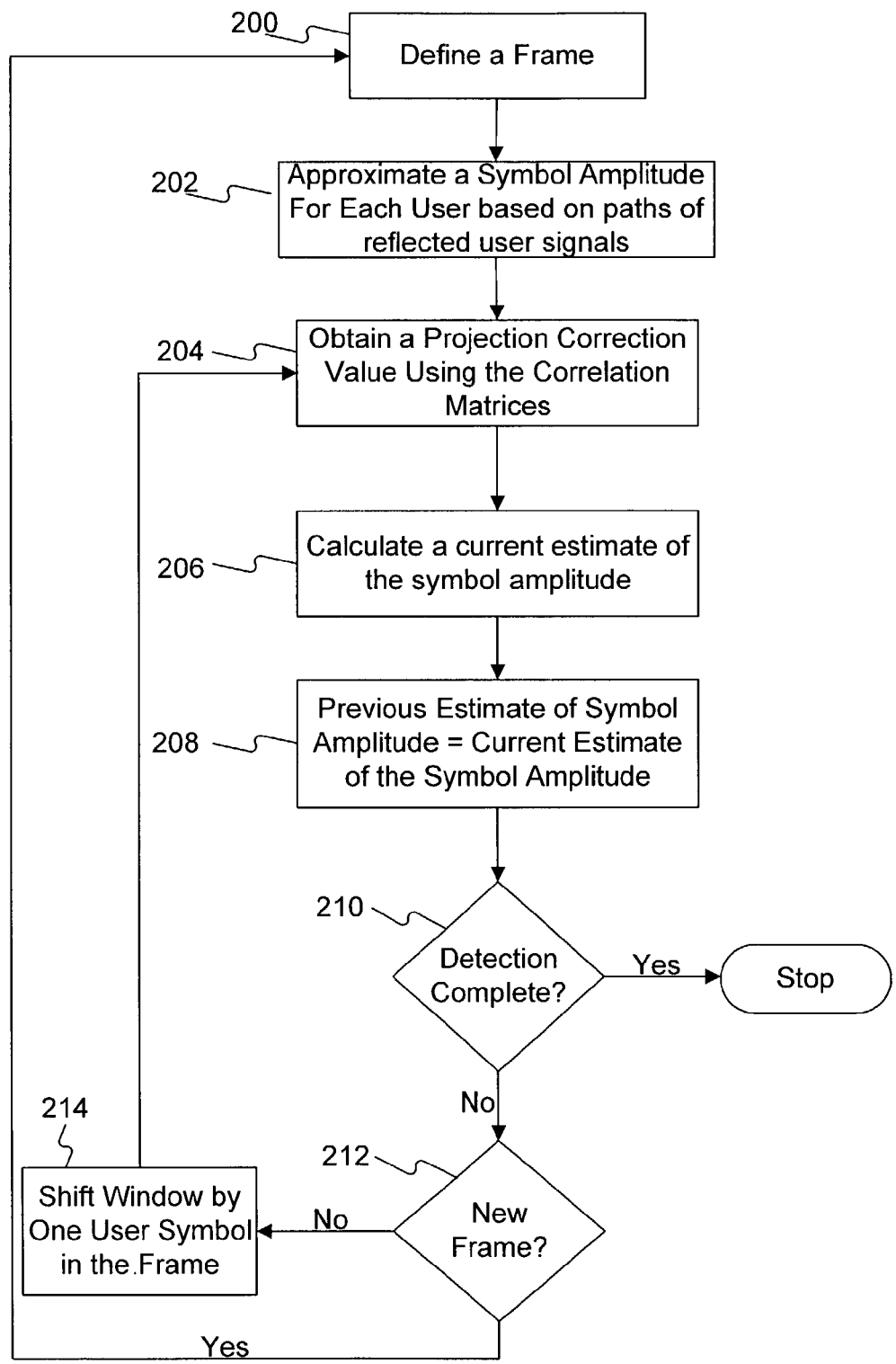
FIG. 2 shows a flow diagram illustrating single-user projection detection for multipath propagation consistent with methods and systems of the present invention.

FIG. 2 is a flow chart illustrating one aspect of perturbation correction consistent with methods and systems of the present invention. To ensure detection of user signals in a CDMA communication scheme, cross-correlation and interference between multiple users must be small. Therefore, CDMA systems generally implement nearly orthogonal user codes for transmitting user signals. At step 200 of FIG. 2, CDMA receiver receives the transmitted signal r(t) and frame buffer 105 defines a frame having a window as shown in FIG. 1B. Over the duration of a frame, the user signals within a current window of the frame are communicated over a significantly invariant or quasi-static channel. Specifically, the channel parameters for each user including code, code delay, carrier frequency, and phase are nearly constant over the entire signal of the frame. Code delay is the beginning time of a code measured by a common reference clock. Carrier frequency is the frequency of the sinusoidal function of the oscillator (not shown) used in the transmitter to up-convert the baseband signal to a desired band (range of frequency) for transmission. CDMA receiver 100 regains the original baseband signal by down-converting the received signal with a signal generated by user code i generator 110 having the same carrier frequency and phase of the original oscillator. The variable r(t) in Eq. (1) defines the baseband signal. The correlation value is an implicit function of the measured r(t) and is usually a complex quantity due to the variable phase at the CDMA receiver 100. Here, although computations using r(t) mainly involve the real part of the value, the imaginary part may also be treated in the same manner. Therefore, embodiments consistent with the present invention are constructed based on the assumption that the channel parameters are constant over an entire frame. Each channel parameter is further defined by a set of margins, i.e., range of values having upper and lower limits, that also determine the duration of the frame. Because the values in the range are usually determined by the resolution of the measurement apparatus, the range values are regarded as nearly constant. The tracking of these parameters has been treated extensively in CDMA systems, is well known, and is not discussed in further detail.

At step 202, CDMA receiver 100 approximates the amplitude of one of the user's signals within the defined frame using an auto-correlation technique. Here, correlator 120 correlates a sample of signal r(t) to the spreading code $\psi_i(\tau_{il})$ generating a single peak at $\tau_{il}$, which represents the portion of signal r(t) having the highest signal to interference ratio. As a result, the transmitted data of a user is maximized and the interference or cross-correlation between user signals is minimized. Furthermore, CDMA receiver 100 calculates a zero order approximate value $a_{nil}$ from the peak amplitude at $\tau_{il}$ based on the assumption that delay tracking is performed and user codes j1 through jM are nearly orthogonal. The single user detector computes symbol amplitude $a_{nil}$ as follows:

$$a_{nil} \approx c_{nil} = (\psi_i(\tau_{il}+nT), r)/N_{nil} = r_{nil}/N_{nil} \tag{2}$$

where $$r_{nil} = (\psi_i(\tau_{il}+nT), r) = \int_{\tau_{il}+nT}^{\tau_{il}+(n+1)T} \psi_i(t-\tau_{il}-nT)r(t)\,dt \text{ and}$$

$$N_{nil} = (\psi_i(\tau_{il}+nT), \psi_i(\tau_{il}+nT))$$

Because CDMA receiver 100 calculates single user amplitude approximation $a_{nil}$ assuming orthogonal codes, which are generally only encountered in theoretical applications, a correction value is obtained according to perturbation theory so that a more practical application can be implemented. To obtain the correction value, CDMA receiver 100 uses the 3-symbol window shown in FIG. 1B. The 3-symbol window enables CDMA receiver 100 to shorten the series of signal r(t) to a time interval having symbols n=−1, 0, and 1, focusing on the middle symbol (n=0) of every user. Using perturbation theory and assigning $c'_{nil}$ as the correction value and $C_{nil}$ as the estimated value from Eq. (2), $a_{nil}$ is defined as follows:

$$a_{nil} = c_{nil} + c'_{nil} \tag{3}$$

If $a_{nil}$ defined in Eq. (3) is substituted into Eq. (1), the following Eq. (4) results:

$$\sum_{i=1}^{M}\sum_{l=1}^{p}\sum_{n=-1}^{n=1} c'_{nil}\psi_i(t-\tau_{il}-nT) = r(t) - \sum_{i=1}^{M}\sum_{l=1}^{p}\sum_{n=-1}^{n=1} c_{nil}\psi_i(t-\tau_{il}-nT) \tag{4}$$

In Eq. (4), r(t) represents the measured value of the received signal. The variable $c_{nil}$ represents the estimated amplitude value obtained from Eq. (2), and $\psi_i$ represents the given user codes. All values on the right hand side of Eq. (4) are known, whereas, $c'_{nil}$ values located on the left hand side of Eq. (4) are the only unknown values.

Next, CDMA receiver 100 calculates (step 204) the perturbation value of $c'_{nil}$ based upon the multipath propagation and the cross-correlation between the symbol of one user and the adjacent symbols of other users within a current window of the frame. CDMA receiver 100 obtains the correction value by calculating $c'_{nil}$ in Eq. (4) using the present values for user i, path l, and current symbol n, where n=0. When the value of the right-hand side of Eq. (4) has been calculated for the symbol of user i, a value of the perturbation correction in matrix-vector notation is approximately given as:

$$c'_{i l 0} = r_{il0} - \sum_{j=1}^{M}\sum_{l=1}^{p}\sum_{n=-1}^{n=1} c_{nil}H_{ji}(n,k,l) \tag{5}$$

where $H_{ji}(n,k,l)$ is a correlation matrix representing the cross-correlation in a current window of the frame between the adjacent symbols n=−1, 0, 1 of user code i and user code j, respectively, along propagation paths k and l. The correlation matrix is given by $$H_{ji}(n, k, l) = \frac{(\psi_j(\tau_{jk}), \psi_i(\tau_{il} + nT))}{N_{jk0}} \quad (6)$$

where $N_{jk0}$ provides a normalization value defined by $N_{jk0} = (\psi_{il}(\tau_{il}), \psi_{jk}(\tau_{jk}))$. As indicated in the formula, the correlation matrix is a function of codes i and j and their respective paths an path delays $\tau_{il}$ and $\tau_{jk}$ and it is independent of other channel parameters.

In FIG. 1B for example, the middle symbol of user 2 overlaps with other users with respect to at most three symbols in the frame in multipath environments. When the two adjacent user symbols are known, the right-hand side of equation (4) allows an explicit calculation of cross-correlation to the middle symbol of user 2. The right-hand side of equation (4) includes r(t), the total received signal of all users and $c_{nil}$, the estimate on the first approximation of the user's symbol amplitude.

Once the correction value has been determined in the manner explained above, processing continues at step 206 where CDMA receiver 100 calculates an estimate of the symbol amplitude by substituting the correction value obtained at step 204 using equation (5) for the term $c'_{nil}$ in equation (3). At step 208, CDMA receiver 100 replaces the first approximation of the symbol amplitude obtained in step 202 with the estimate of symbol amplitude $a_{nil}$.

At step 210, CDMA receiver 100 determines whether the entire signal of the current session has been processed, and every user's amplitude has been corrected. When the entire signal has been processed, i.e., the amplitude of the entire signal has been estimated, CDMA receiver 100 obtains the final estimated amplitude value $a_{nil}$ from equation (2), thus, allowing the approximate amplitude value $a_{nil}$ of r(t) to be obtained. In contrast, if the entire signal has not been processed, processing continues at step 212 where CDMA receiver 100 determines whether a new frame has been defined (or obtained, or present, or received). When a new frame is defined, processing returns to step 202 where CDMA receiver 100 performs a first approximation of the signal amplitude and repeats the execution steps 204 through 210. On the other hand, when CDMA receiver 100 does not define a new frame (step 212), it performs the next iteration of amplitude estimation. This next iteration updates the estimated amplitude value based upon a new symbol amplitude estimate of the current user in the current window of the frame. Performing the calculation of the next iteration begins at step 214 where CDMA receiver 100 shifts the current window by one user symbol. This window shift is defined in equation (5) by the term n that corresponds to samples of user code i. Processing continues by returning to step 204, where CDMA receiver 100 calculates the correction value corresponding to the new user symbol within the current window of the frame and repeats the execution of steps 206 through 210.

Figure 3:
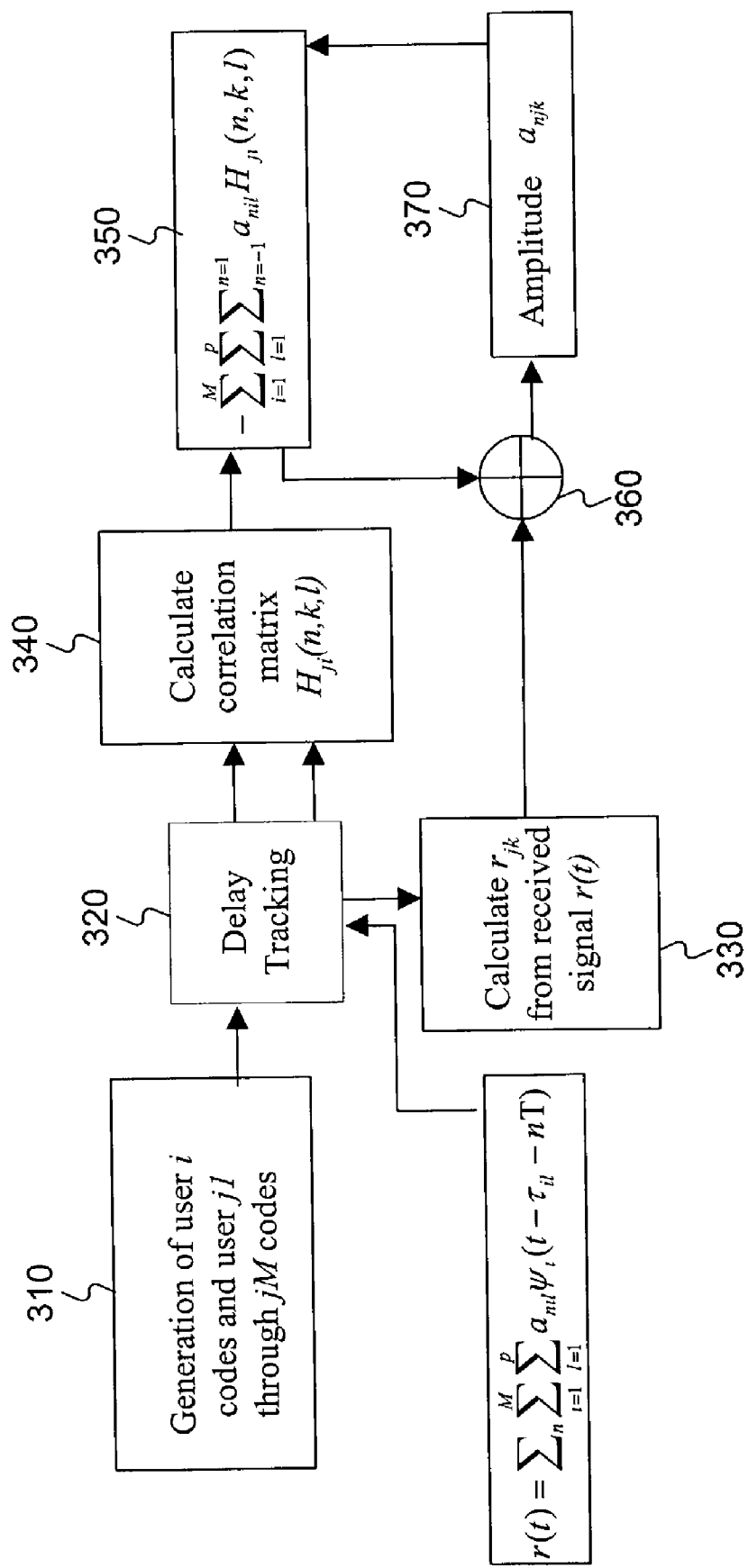
FIG. 3 is a block diagram illustrating an amplitude approximation consistent with methods and systems of the present invention.

FIG. 3 is a block diagram illustrating an example of an amplitude approximation operation performed by CDMA receiver 100. The amplitude approximation operation further includes a feedback mechanism and higher order perturbation. In this example, block 330 calculates a zero-order amplitude approximation of a user i signal contained in received signal r(t). CDMA receiver 100, at block 310, generates user i codes and user j codes via user code i generator 110 and user code j generator 115, respectively. After generation, these codes are selectively provided to correlator banks 120 and 130 so that delay tracking (block 320) can be performed for each user signal contained within received signal r(t). Next at block 330, CDMA receiver 100 calculates, via correlator bank 130, multiplier bank 140, and summer 150, a value $r_{jk}$ of received signal r(t) excluding the contributions of the selected user i signal. CDMA receiver 100 further generates, at block 340, a correlation matrix $H_{ji}(n,k,l)$ that represents the cross correlation of adjacent symbols of user i and at least one other user j of received signal r(t) in a current window of the frame. Correlator 170 performs the cross-correlation operation as defined by Eq. (5). At block 350, CDMA receiver 100 calculates the amplitude value resulting from the cross-correlation calculation determined by correlation matrix $H_{ji}(n,k,l)$. When a new amplitude is available, block 350 uses the new amplitude for computing an amplitude approximation of the new symbol of the same user or other users. Next at block 360, CDMA receiver 100 calculates the perturbation correction value $c'_{nil}$ by adding received signal value $r_{jk}$ and the cross-correlation amplitude value calculated at block 350. At block 370, CDMA receiver 100 calculates a corrected amplitude value $a_{nil}$ of received signal r(t) by adding the corrected amplitude value to the previously estimated amplitude value, as shown in Eq. (3).

Figure 4:
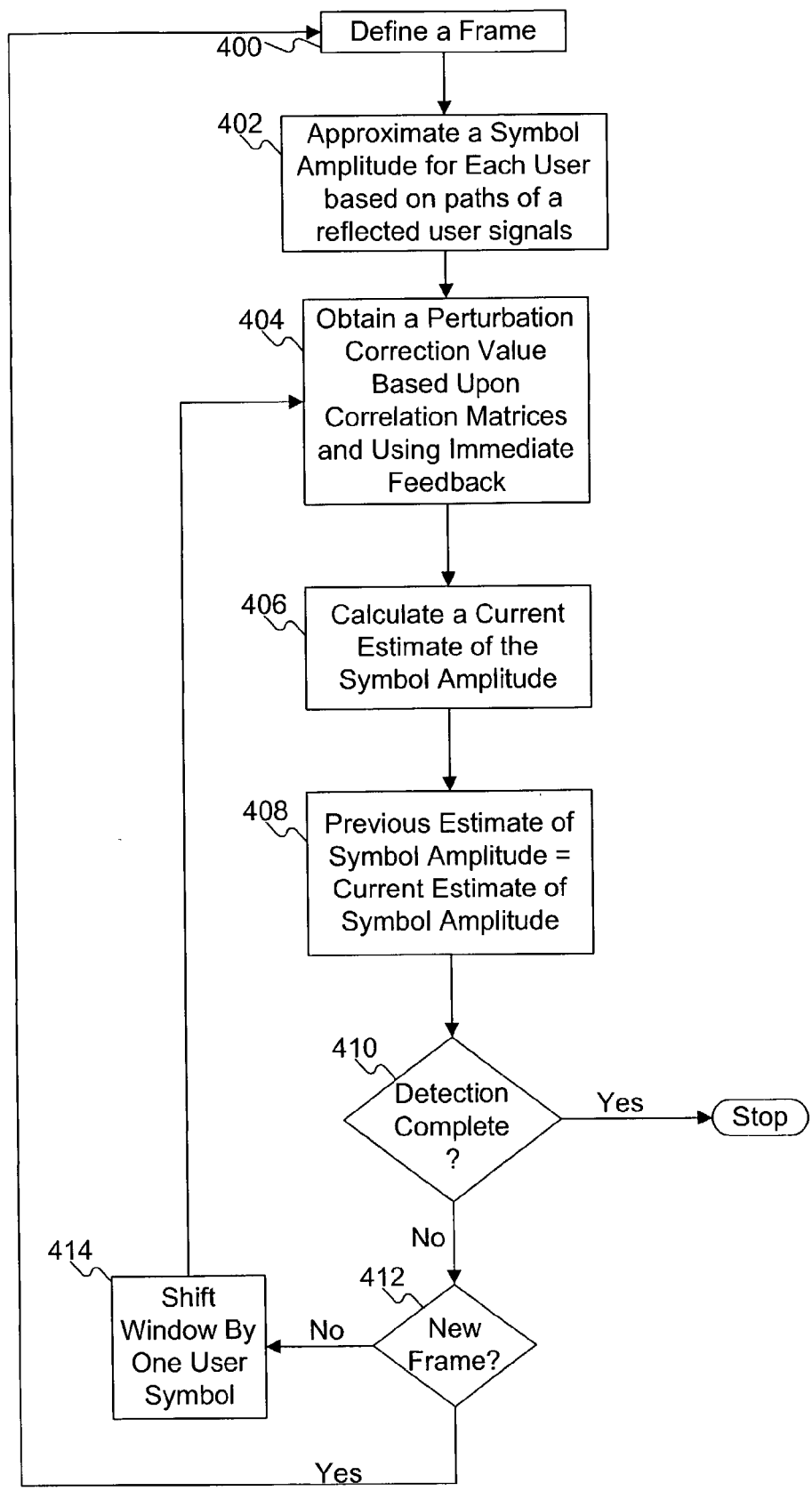
FIG. 4 is a flow diagram illustrating single user projection detection for multipath propagation using immediate feedback consistent with methods and systems of the present invention.

The flow chart shown in FIG. 4 illustrates a further process consistent with methods and systems of the present invention. The process in FIG. 4 relates to the perturbation method of FIG. 2, for a case in which the value of the previous approximation is used to calculate the next symbol. Steps 400, 402, and 406-414 are the same as steps 200, 202, and 206-214, respectively, of FIG. 2. At step 404, the CDMA receiver obtains a perturbation correction value using an immediate feedback technique. This feedback technique is defined by equation (7) in which the summation on the right-hand side of equations (4) and (5) is changed to the following expression:

$$\sum ( ) = \sum_{j=1}^{M} \sum_{l=1}^{P} \sum_{n=0}^{1} c_{nil} H_{ji}(n, k, l) + \sum_{j=1}^{M} \sum_{l=1}^{P} a_{(-1)il} H_{ji}(-1, k, l) \quad (7)$$

Using immediate feedback for the calculation of the next symbol significantly improves the perturbation correction on the basis that there is no delay about the correction. This is in contrast to conventional techniques in which many symbols are processed before feedback can be performed.

For the processing schemes described above and illustrated in FIGS. 2-4, obtaining the correlation matrix $H_{ji}(n, k, l)$ for a whole frame requires substantial computation. Correlation matrix $H_{ji}(n,k,l)$, as shown in Eq. (6), correlates each symbol n=−1, 0, 1 contained within a window of the frame for users i and j and along paths l and k (where l and k each 1 through p paths), respectively. In performing cross-correlation computations via correlation matrix $H_{ji}(n, k,l)$, CDMA receiver 100 performs a total number of computations that is proportional to the product $M^3 p^2$. As noted above, when the signal codes of users are orthogonal and are identical for each symbol, the number of computations is relatively small. If each symbol of the orthogonal code is multiplied by a scrambling code that is longer than the symbol and overlaps adjacent frames, however, then a matrix of every symbol must be computed. A scrambling code is a random sequence multiplied chip by chip on the spreading code. The scrambling code further randomizes the spreading codes so that the spreading codes have less cross correlation when they are not synchronous. In the multi-user detection receiver, scrambling becomes unnecessary because the interference will eventually be cancelled. Multiplying each symbol of the orthogonal code by a scrambling code, however, requires a very large number of computations. Nevertheless, when the scrambling code is longer than the symbol but much shorter than the frame, the calculation of the correlation matrices remains efficient because the same correlation matrix is reusable. For example, in performing higher order perturbation computations, chip offset values are used to obtain a more accurate determination of the level of interference encountered by the detected user signal. By interpolating the values of user symbols at a fractional chip offset, the elements at integral chip offsets determined by Eq. (2) may be computed only once for correlation matrix $H_{ji}(n,k,l)$. Thus, the number of computations performed by correlation matrix $H_{ji}(n,k,l)$ is effectively proportional to the product of $M^2 p^2$.

In another embodiment, a CDMA system uses a process for reducing the effects of adjacent cell interference in accordance with systems and methods consistent with the present invention. In this embodiment, constructing new Walsh codes from existing Walsh codes enables the creation of an interference reduction window (IRW). At a base station, existing Walsh codes are strategically padded with zeroes so that an IRW is established at the receiver when signal r(t) is processed at the receiver. An example of a set of four Walsh codes used to establish the IRW are shown in Eq. (8) as follows:

$$\begin{pmatrix} 1 & 1 & 000000 & 1 & 1 \\ 1 & -1 & 000000 & 1 & -1 \\ 1 & 1 & 000000 & -1 & -1 \\ 1 & -1 & 000000 & -1 & 1 \end{pmatrix} \quad (8)$$

In Eq. (8) the upper codes shown in rows 1 and 2 are even and the lower codes shown in rows 3 and 4 are odd. These are symmetrically portioned sequences. Furthermore, if the transmission of the sequences is synchronized, so that each having a different delay offset at the receiver, which is less than the IRW, then a correlation matrix for the four codes may be created as follows:

$$\begin{pmatrix} ab & 00 \\ cd & 00 \\ 00 & ef \\ 00 & gh \end{pmatrix} \quad (9)$$

Therefore, there is no interference between even and odd codes. In other words, we can neglect their interference. Variables a through h represent interference resulting from a correlation between two even codes (ab and cd) and two odd codes (ef and gh) of Eq. (8). As a result, the number of elements to be computed for the correlation matrix of Eq. (9) is reduced by fifty percent. CDMA receiver 100 can reduce the level of interference caused by multi-user detection using the perturbation methods described in Eqs. (1) through (7) above. As shown in Eq. (8), the newly constructed Walsh codes are effectively partitioned into two parts—a front code and a rear code. The front code corresponds to the code values before the inserted zeroes and the rear code corresponds to the code values after the inserted zeroes. Moreover, the rear code may be equal to either the current value of the front code or the negative of the current value of the front code. To combat adjacent cell interference (ACI) due to delay offsets of corresponding user symbols, the newly generated Walsh codes establish gaps of equal length between each user symbol within the frame. The gaps remain when both the front and rear codes are scrambled by the same scrambling code or transformed by the same matrix. A symbol gap sequence is shown in Eq. (10) as follows:

(Gap, Orthogonal_code_set, Gap, ±Orthogonal_code_set, Gap) (10)

The gap is padded with zero in real implementation.

Figure 5A:
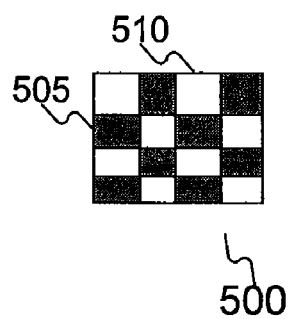
FIG. 5A illustrates a multi-cell configuration consistent with methods and systems of the present invention.
Figure 5B:
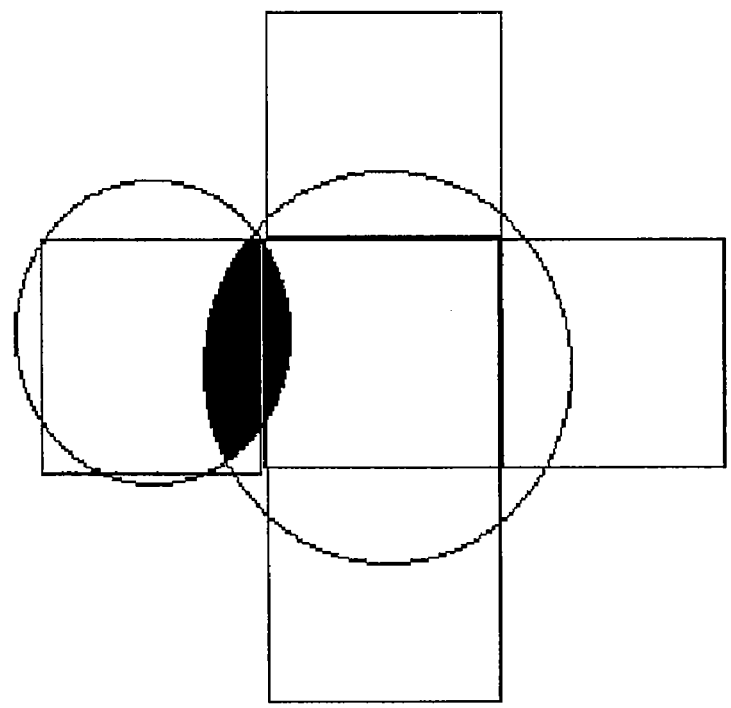
FIG. 5B illustrates an extent of signal overlap between adjacent cells consistent with conventional multi-user detection systems.

FIGS. 5A and 5B illustrate a rectangular cell configuration for a CDMA system. FIG. 5A illustrates a rectangular cell configuration 500, where the symbol-gap sequence of Eq. (10) reduces ACI when the even codes are applied to a selected cell and odd codes are applied to cells adjacent to the selected cell. For example shaded cells 505 are even cells and the unshaded cells 510 are odd cells. When located at one of the four corners of the rectangular cell, although having the same symmetry (either even or odd), the users in these cells have very little cross-correlation with the centrally located cell because of the larger distance, therefore the interference caused by the cells located at each of the four corners can be neglected. As a result, the number of interfering users is reduced to a minimum, thus reducing ACI to a minimum.

FIG. 5B illustrates an example of the extent of signal overlap between adjacent cells of conventional multiuser detection systems. By creating an IRW, in the manner described above, the signal overlap as shown by the shaded portion in FIG. 5B, is either reduced or cancelled. When creating an IRW, as many zeroes as needed may be inserted into the existing Walsh codes so that the effects of interference between the adjacent even and odd cells can be cancelled. The number of padded zeroes is equal to the length of the IRW. In other words, increasing the number of zeroes effectively increases the length of the IRW. Moreover, if the delay spread of each user symbol is less than the length of the IRW, then no interference will occur between the even and odd cells. Therefore, as shown in Eq. (11), the maximum IRW is determined to be a function of the delay spread, and propagation delay differentials as follows:

$$IRW = Max(\text{delay spread, propagation delay differentials}) \quad (11)$$

where the delay spread also includes signal degradation associated with the characteristics of a pulse-shaping filter located at the transmitter. Moreover, the propagation delay differentials correspond to a difference in propagation delays of the nearest two base stations for each user transmitting or receiving outside a border region between adjacent cells, as shown by the shaded portion in FIG. 5B.

Next, the CDMA receiver calculates a bit error rate (BER) for single user detection and perturbation projection discussed above is calculated from Eqs. (2) and (3) respectively. Then using Eq. (11), the CDMA receiver calculates the maximum IRW for multipath propagation.

Figure 6B:
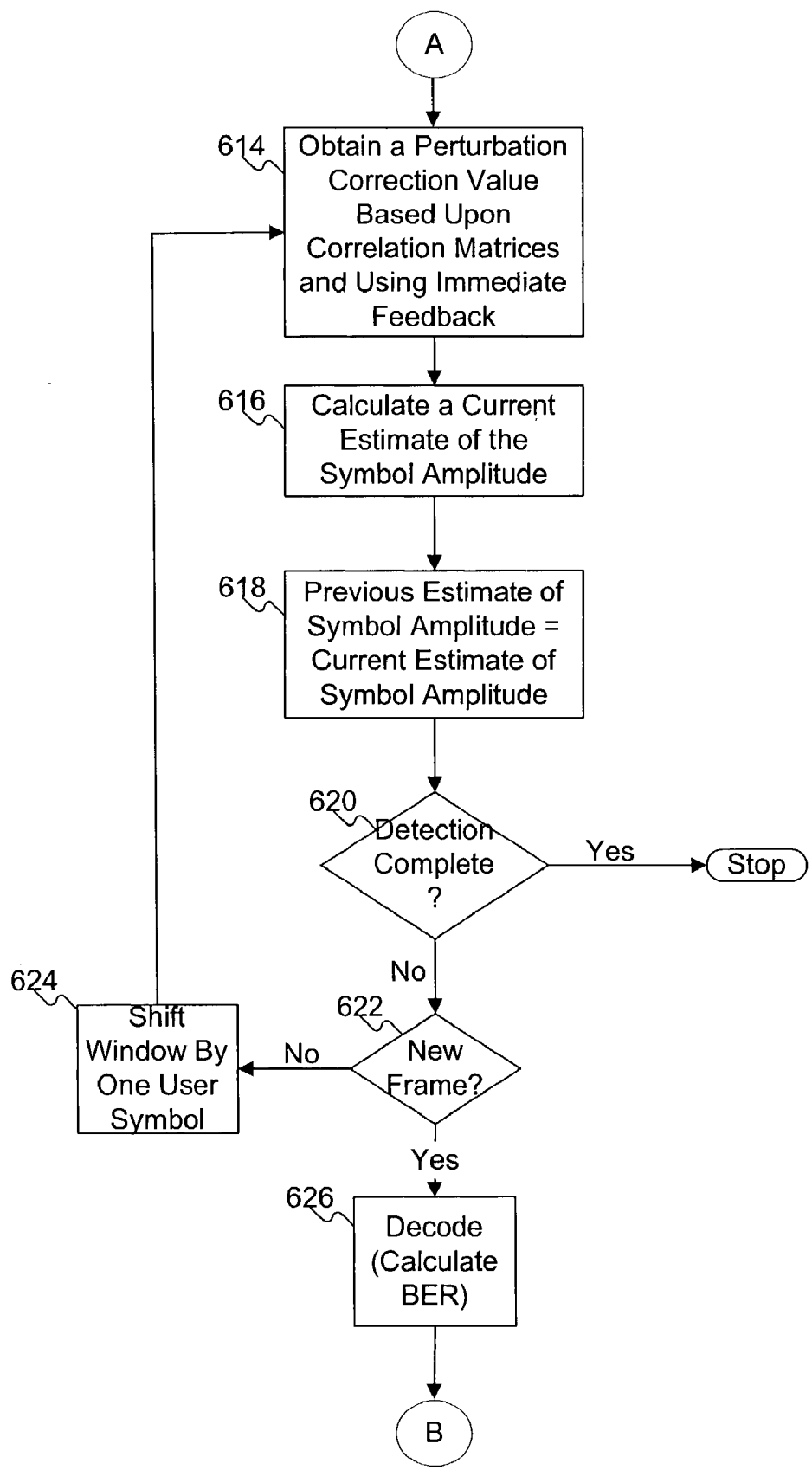

The flow chart shown in FIGS. 6A-6B illustrates single user projection detection for multipath propagation with adjacent cell interference cancellation consistent with methods and systems of the present invention. In this example, M users are assigned to M-dimensional Walsh codes in a single cell environment. The relative propagation delay of each user code is random, and the delay-spread distribution $\tau_{ij}$ of each of the M-users is assumed to be an independent identical distribution (iid) in the interval [0, dmax], where dmax is the maximum delay spread. Furthermore, the unit of delay is equal to one sample and calculations are performed at a resolution of 8 samples per chip. Near-far fading is simulated through iid distribution (e.g. [0, 1]) of a detected user's absolute amplitude at $\tau_{il}$. The absolute amplitude at $\tau_{il}$ of a user remains constant in a frame, however, it may vary over the duration of each subsequent frame. The characteristic of absolute amplitude at $\tau_{il}$ is known as Rayleigh fading. The process shown in FIGS. 6A-6B relates to the perturbation method of FIG. 4, in a case when the value of the previous approximation is used to calculate the next symbol and the Walsh codes have been padded with zeroes.

FIG. 6A describes how the above mapping (FIG. 5A) and the functions are implemented in the present CDMA system. Note that FIG. 6A includes only those functions required for practicing the present invention, i.e. (1) the replacing of the spreading code by even or odd codes and dedicating the even or odd codes to specific cells in order to reduce adjacent cell (intra-cell) interference and (2) the application of a perturbation method to reduce remaining intra-cell interference. All other processing remains substantially the same as for conventional CDMA systems.

In FIG. 6A. a system controller distributes 601 the even and odd codes separately to neighboring cells according to FIG. 5A. Therefore only even (or odd) codes are used by the base station and mobile stations in the black (or blank) cells. For simplicity without loss of generality only the processing of two neighboring cells are shown. Also the functional blocks on the right are the same as those on the left. The transmitter at the base station (or a mobile station) inserts IRW zeros (600), scrambles (605) the given code, modulates the data to be transmitted with the scrambled code, and packages (602) it for transmission over a medium. The transmission at different transmitters is synchronized at step 603 so that the signal arrival time at the receivers from different transmitters is within a delay of IRW, leading to the canceling of interference between the even and the odd codes as described in Eqs. (8) and (9). The communication medium may include any medium such as air, cable, wire, fiber, or the like.

The receiver uses the same scrambled code for CDMA processing. The code is either the even code or the odd code according to what is assigned to that cell. CDMA receiver 100 receives signal r(t) (step 606) which may be modified by the medium and synchronizes the user code of each user signal contained within signal r(t) to a corresponding local user code (step 608). Steps 610 and 612-624 (FIG. 6B) describe identical operations as those described in steps 400-414, respectively, of FIG. 4. Next, at step 626, a new frame is detected and the user signal is decoded. During decoding, the bit error rate (BER) is calculated.

Figure 7:
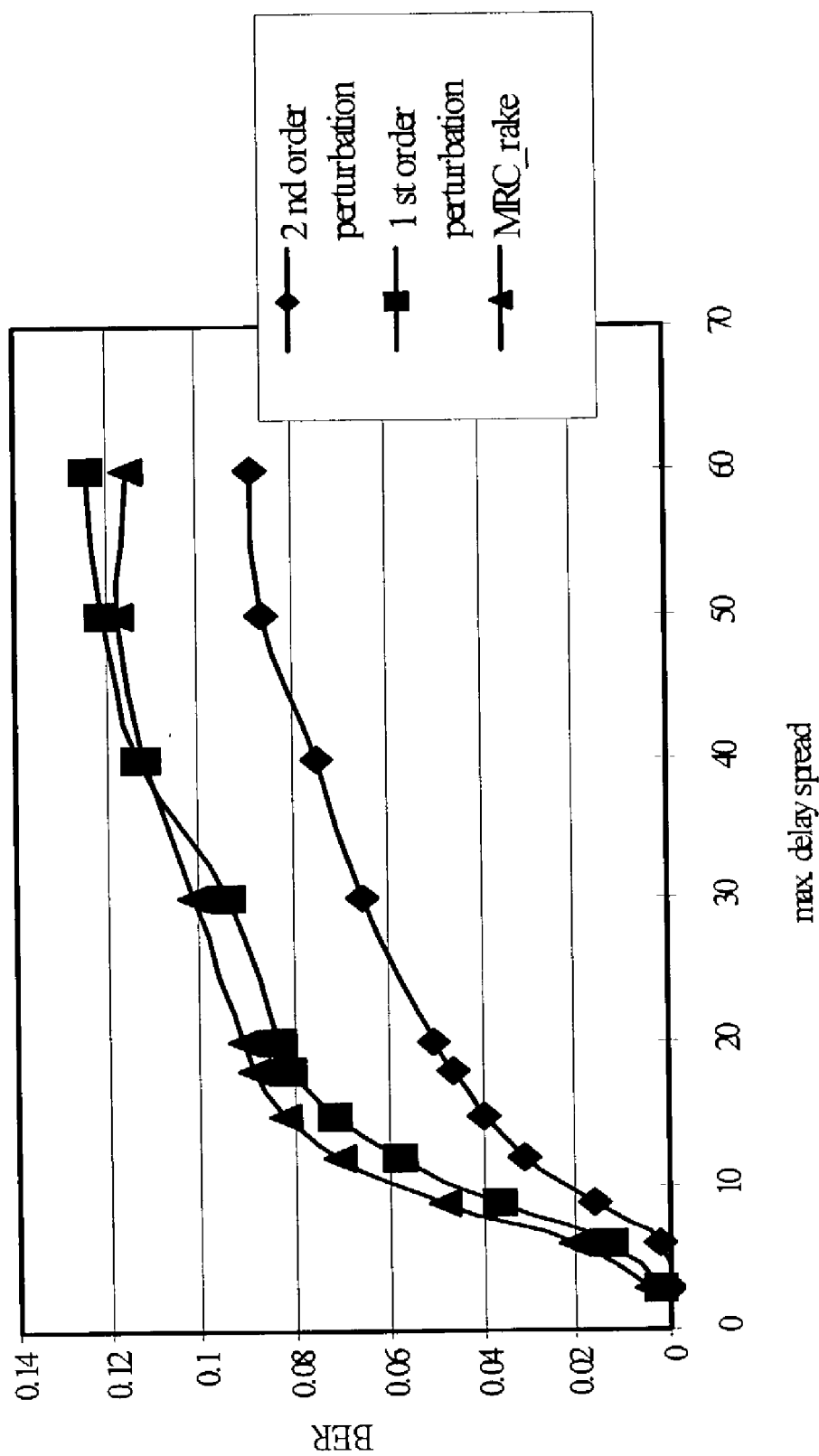
FIGS. 7-9 illustrate results of perturbation correction simulation consistent with systems and methods of the present invention.
Figure 8:
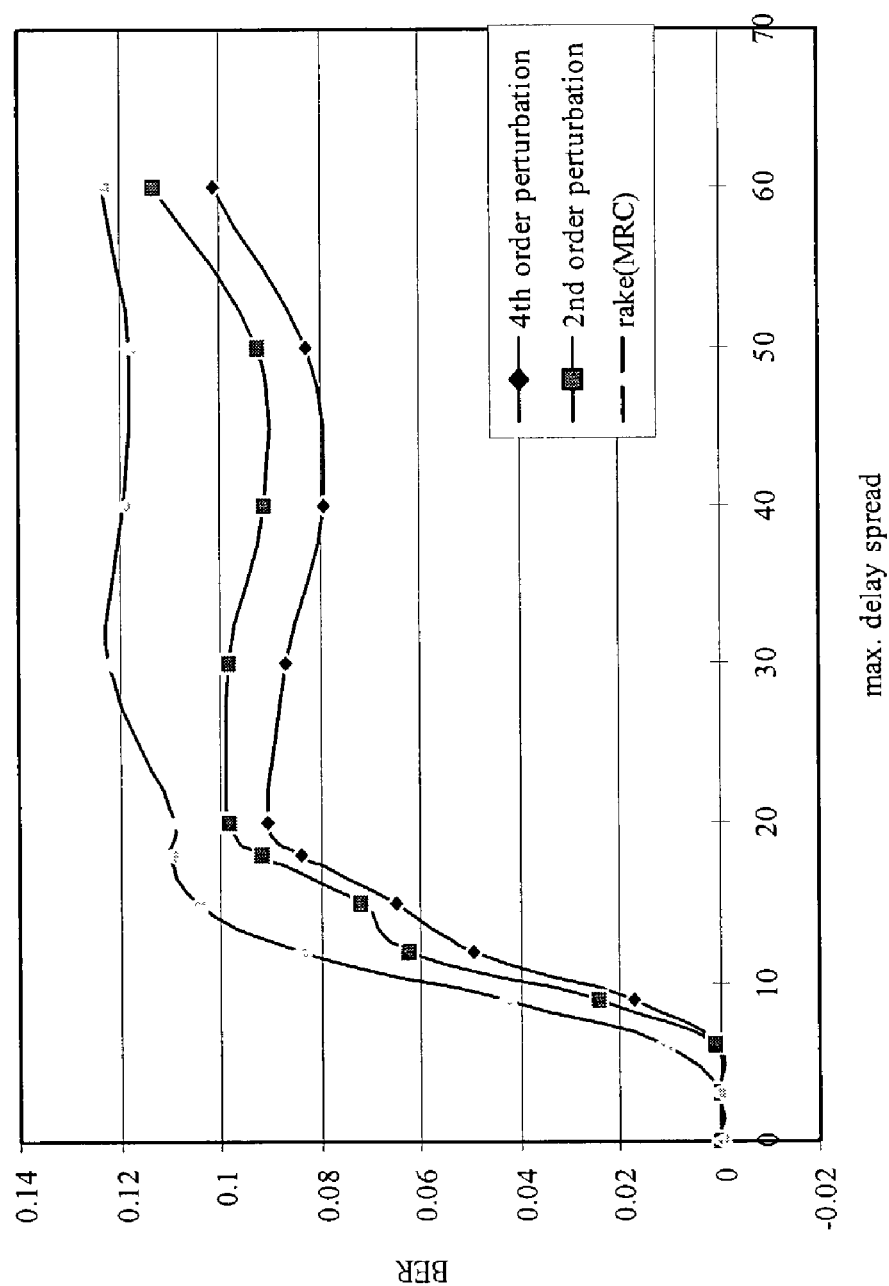
Figure 9:
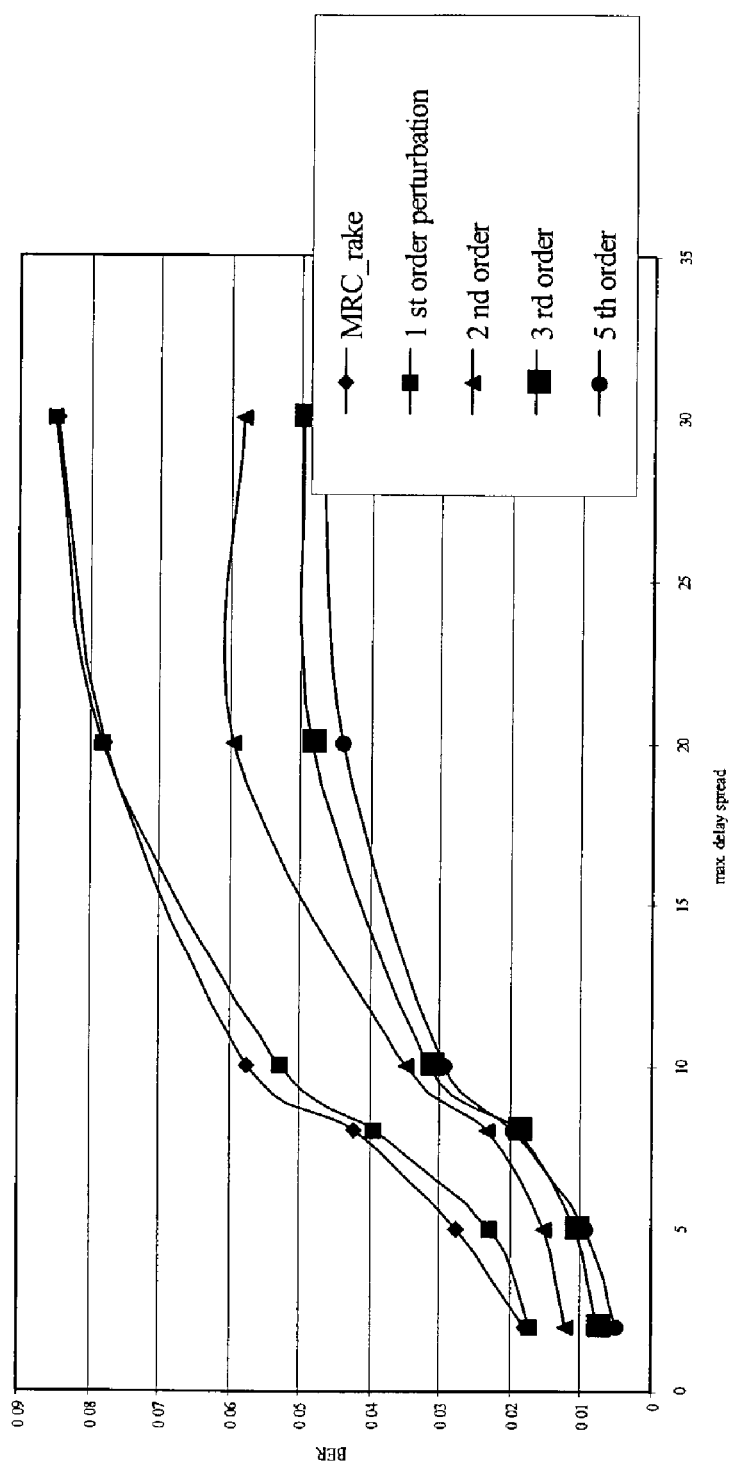

FIGS. 7-9 illustrate examples of perturbation projection in which IRW=0 for all simulations. In these examples, M users are assigned to M-dimensional Walsh codes in a single cell environment. The relative propagation delay of each user code is random, and the delay-spread distribution $\tau_{il}$ of each of the M-users is assumed to be an independent identical distribution (iid) in the interval [0, dmax], where dmax is the maximum delay spread. Furthermore, the unit of delay is equal to one sample and calculations are performed at a resolution of 8 samples per chip. Near-far fading is simulated through iid distribution (e.g. [1]) of a detected user's absolute amplitude at $\tau_{il}$. The absolute amplitude at $\tau_{il}$ of a user remains constant in a frame, however, it may vary over the duration of each subsequent frame. The characteristic of absolute amplitude at $\tau_{il}$ is known as Rayleigh fading.

FIG. 7 is a graph comparing, in a 2-path Rayleigh fading environment, the interference canceling capability of a method and system consistent with the present invention with the performance of a rake receiver using maximum ratio combining (MRC). If the multipath signals received at CDMA receiver 100 are not of equal strength, then the strongest path of each user signal may be selected and perturbation correction as described above may be employed to cancel the effects of interference. As shown in the graph, the BER of the rake receiver is greater than most of the first order perturbation correction and all of the second order perturbation correction. As a result, CDMA receiver 100 may be significantly simplified, as only the strongest path of each signal needs to be detected.

FIG. 8 is a graph comparing, in a 3-path Rayleigh fading environment, the interference canceling capability of a method and system in accordance with the present invention with the performance of a rake receiver. Assuming identical conditions as encountered by the CDMA receiver of FIG. 7, the BERs of both second and higher order perturbation correction are less than the BER of the rake receiver.

FIG. 9 is a graph comparing the results of higher order perturbation correction of a CDMA receiver under near-far conditions in accordance with methods and systems consistent with the present invention with the performance of a rake receiver. As shown in the graph, higher order perturbation correction provides a substantial reduction in BER over the rake receiver. For example, first order perturbation correction provides results that are similar to those achieved by a rake receiver, but second order and higher order perturbation correction provide a substantial improvement over the results of the rake receiver.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of detecting a single user in a multi-user communication system, the method comprising:
   receiving a plurality of user signals;
   defining a frame having a window that includes a sequence of at least three symbols for each received user signal;
   calculating an amplitude approximation of a selected one of the plurality of user signals based on a zero-order amplitude approximation of the sequence;
   correlating the sequence of the selected user signal with the sequence of at least one other user signal to obtain a correlation matrix within the window of the frame based at least on a plurality of reflection paths corresponding to the sequence of each received user signal;
   calculating an amplitude correction value based on the correlated sequences of the frame for adjusting the amplitude approximation; and
   shifting the window of the frame, when the selected user signal has not been processed in its entirety, so that the amplitude approximation can be adjusted for each additional sequence.

2. The method of claim 1, further comprising:
   calculating a bit of the selected user signal based on the adjusted amplitude approximation.

3. The method of claim 1, wherein upon defining a new frame the method further comprises:
selecting a second one of the plurality of user signals;
correlating the sequence of the selected second user signal with the sequence of at least one other user signal to obtain a correlation matrix within the window of the new frame based at least on the plurality of reflection paths associated with each received user signal;
calculating an amplitude correction value based on the correlated sequences of the new frame for adjusting the amplitude approximation; and
shifting the window of the new frame, when the selected user signal in the new frame has not been processed in its entirety, so that the amplitude approximation can be adjusted for each additional sequence.

4. The method of claim 1, further comprising:
performing a higher order perturbation processing including:
returning the window to an initial position of the frame,
calculating an amplitude correction value based on previously estimated perturbation amplitudes of the frame for adjusting the amplitude approximation; and
shifting the window of the frame, when the selected user signal has not been processed in its entirety, so that the amplitude approximation can be adjusted for each additional sequence.

5. The method of claim 1,
wherein the amplitude correction value is equal to the zero-order amplitude approximation minus a linear combination of a plurality of previous amplitude approximations of each user multiplied by the corresponding correlation matrix in the window.

6. A method of detecting a single user across multiple cells of a communication system, the method comprising:
receiving a plurality of user signals;
defining a frame having a window that includes a sequence of at least three symmetrically partitioned symbols for each received user signal;
calculating an amplitude approximation of a selected one of the plurality of user signals based on a zero-order amplitude approximation of the sequence of the selected user signal;
correlating the sequence of the selected user signal with the sequence of at least one other user signal to obtain a correlation matrix within the window of the frame based at least on a plurality of reflection paths associated with each received user signal;
calculating an amplitude correction value based on the correlated sequences of the frame for adjusting the amplitude approximation; and
shifting the window of the frame, when the selected user signal has not been processed in its entirety, so that the amplitude approximation can be adjusted for each additional symmetrically partitioned sequence.

7. An apparatus for detecting a single user in a multi-user communication system, comprising:
means for receiving a plurality of user signals;
means for defining a frame having a window that includes a sequence of at least three symbols for each received user signal;
means for calculating an amplitude approximation of a selected one of the plurality of user signals based on a zero-order amplitude approximation of the sequence of the selected user signal;
means for correlating the sequence of the selected user signal with the sequence of at least one other user signal to obtain a correlation matrix within the window of the frame based at least on a plurality of reflection paths associated with each received user signal;
means for calculating an amplitude correction value based on the correlated sequences of the frame for adjusting the amplitude approximation; and
means for shifting the window of the frame, when the selected user signal has not been processed in its entirety, so that the amplitude approximation can be adjusted for each additional sequence.

8. An apparatus for detecting a single user across multiple cells of a communication system, the system comprising:
means for receiving a plurality of user signals;
means for defining a frame having a window that includes a sequence of at least three symmetrically partitioned symbols for every received user signal;
means for obtaining an amplitude approximation of a selected one of the plurality of user signals based on a zero-order amplitude approximation of the sequence of the selected user signal;
means for correlating the sequence of the selected user signal with the sequence of at least one other user signal to obtain a correlation matrix within the window of the frame based at least on a plurality of reflection paths associated with each received user signal;
means for calculating an amplitude correction value based on the correlated sequences of the frame for adjusting the amplitude approximation; and
means for shifting the window of the frame, when the selected user signal has not been processed in its entirety, so that the amplitude approximation can be adjusted for each additional symmetrically partitioned sequence.

9. A method for single user perturbation projection in a multi-user communication system, the method comprising:
at a transmitter,
modifying existing Walsh codes to form a symmetrically partitioned sequence so that front and rear codes are separated by a finite gap;
scrambling the front and rear codes with a single scrambling code;
packaging a plurality of user signals, wherein the user signals are code modulated with at least the modified Walsh codes; and
transmitting the packaged plurality of user signals over a wireless medium.

10. The method of claim 9, wherein modifying existing Walsh codes comprises inserting zeroes between the Walsh codes to form an interference reduction window.

11. The method of claim 10, wherein each Walsh code corresponding to each user signal is synchronized to maintain the effectiveness of the interference reduction window.

12. The method of claim 9, further comprising:
at a receiver,
receiving the packaged user signals;
synchronizing the packaged user signals to a corresponding local user code;
defining a frame having a window that includes a sequence of at least three symmetrically partitioned symbols for each synchronized user signal, wherein the length of the window is determined by the modified Walsh code;
calculating an amplitude approximation of a selected first one of the plurality of user signals based on a zero-order amplitude approximation of the sequence of the selected user signal;

correlating the sequence of the selected user signal with the sequence of at least one other user signal to obtain a correlation matrix within the window of the frame based at least on a plurality of reflection paths associated with each received user signal;

calculating an amplitude correction value based on the correlated sequences of the frame for adjusting the amplitude approximation; and shifting the window of the frame, when the selected user signal has not been processed in its entirety, so that the amplitude approximation can be adjusted for each additional symmetrically partitioned sequence.

13. The method of claim 12, further comprising:
calculating a bit of the selected user signal based on the adjusted amplitude approximation.

14. The method of claim 12, wherein upon defining a new frame the method further comprises:
selecting a second one of the plurality of user signals;
correlating the sequence of the selected second user signal with the sequence of at least one other user signal to obtain a correlation matrix within the window of the new frame based at least on the plurality of reflection paths associated with each received user signal;
calculating an amplitude correction value based on the correlated sequences of the new frame for adjusting the amplitude approximation; and
shifting the window of the new frame, when the selected user signal in the new frame has not been processed in its entirety, so that the amplitude approximation can be adjusted for each additional sequence.

15. The method of claim 14, further comprising:
performing a higher order perturbation processing including:
returning the window to an initial position of the frame;
calculating an amplitude correction value based on previously estimated perturbation amplitudes of the frame for adjusting the amplitude approximation; and
shifting the window of the frame, when the selected user signal has not been processed in its entirety, so that the amplitude approximation can be adjusted for each additional sequence.

16. The method of claim 12, wherein the amplitude correction value is equal to the zero-order amplitude approximation minus a linear combination of a plurality of previous amplitude approximations of each user multiplied by the corresponding correlation matrix in the window.

17. A method for single user perturbation projection in a multicell communication system, the method comprising:
at a transmitter,
generating even Walsh codes in a first cell and odd Walsh codes in adjacent cells;
modifying the even and odd Walsh codes to provide front and rear codes separated by a finite gap;
scrambling the front and rear codes with a single scrambling code;
packaging a plurality of user signals, wherein the user signals are code modulated with at least the modified Walsh codes; and
transmitting the packaged user signals over a wireless medium.

18. The method of claim 17, wherein modifying the even and odd Walsh codes comprises inserting zeroes between the front and rear codes to form an interference reduction window.

19. The method of claim 18, wherein each Walsh code corresponding to each user signal is synchronized to maintain the effectiveness of the interference reduction window.

20. The method of claim 17, further comprising:
at a receiver,
receiving the packaged user signals;
synchronizing the packaged user signals to a corresponding local user code;
defining a frame having a window that includes a sequence of at least three symmetrically partitioned symbols for each synchronized user signal, wherein the length of the window is determined by the modified Walsh code;
calculating an amplitude approximation of a selected one of the plurality of user signals based on a zero-order amplitude approximation of the sequence of the selected user signal;
correlating the sequence of the selected user signal with the sequence of at least one other user signal to obtain a correlation matrix within the window of the frame based at least on a plurality of reflection paths associated with each received user signal;
calculating an amplitude correction value based on the correlated sequences of the frame for adjusting the amplitude approximation; and
shifting the window of the frame, when the selected user signal has not been processed in its entirety, so that the amplitude approximation can be adjusted for each additional symmetrically partitioned sequence.

21. The method of claim 20, further comprising:
calculating a bit of the selected user signal based on the adjusted amplitude approximation.

22. The method of claim 20, wherein upon defining a new frame the method further comprises:
selecting a second one of the plurality of user signals;
correlating the sequence of the second selected user signal with the sequence of at least one other user signal to obtain a correlation matrix within the window of the new frame based at least on the plurality of reflection paths associated with each received user signal;
calculating an amplitude correction value based on the correlated sequences of the new frame for adjusting the amplitude approximation; and
shifting the window of the new frame, when the selected user signal in the new frame has not been processed in its entirety, so that the amplitude approximation can be adjusted for each additional symmetrically partitioned sequence.

23. The method of claim 20, further comprising:
performing a higher order perturbation processing including:
returning the window to an initial position of the frame;
calculating an amplitude correction value based on previously estimated perturbation amplitudes of the frame for adjusting the amplitude approximation; and
shifting the window of the frame, when the selected user signal has not been processed in its entirety, so that the amplitude approximation can be adjusted for each additional symmetrically partitioned sequence.

24. The method of claim 20, wherein the amplitude correction value is equal to the zero-order amplitude approximation minus a linear combination of a plurality of previous amplitude approximations of each user multiplied by the corresponding correlation matrix in the window.

25. A cellular communication system comprising:
means for modifying existing Walsh codes to generate front and rear Walsh codes;
means for scrambling the front and rear Walsh codes with a single scrambling code;

means for packaging a plurality of user signals, wherein the user signals are code modulated with at least the modified Walsh codes;

means for inserting zeroes into the packaged user signals to form an interference reduction window;

means for dedicating even Walsh codes to a first cell and odd Walsh codes to adjacent cells;

means for transmitting the packaged user signals;

means for receiving the packaged user signals;

means for synchronizing the packaged user signals to a corresponding local user code;

means for defining a frame having a window that includes a sequence of at least three symmetrically partitioned symbols for each synchronized user signal, wherein the length of the window is determined by the modified Walsh codes;

means for calculating an amplitude approximation of a selected one of the plurality of user signals based on a zero-order amplitude approximation of the sequence of the selected user signal;

means for correlating the sequence of the selected user signal with the sequence of every other user signal to obtain a correlation matrix within the window of the frame based at least on a plurality of reflection paths associated with each received user signal;

means for calculating an amplitude correction value based on the correlation matrices of the frame for adjusting the amplitude approximation; and means for shifting the window of the frame, when the selected user signal has not been processed in its entirety, so that the amplitude approximation can be adjusted for each additional symmetrically partitioned sequence.

26. The system of claim 25, wherein the odd Walsh codes are dedicated exclusively to the first cell and the even Walsh codes are dedicated to the adjacent cells to reduce the adjacent cell interference.

27. The system of claim 25, wherein each Walsh code corresponding to each user signal is synchronized to maintain the effectiveness of the interference reduction window.

* * * * *